(12) United States Patent
Erhardt

(10) Patent No.: US 8,375,991 B2
(45) Date of Patent: Feb. 19, 2013

(54) VALVE ASSEMBLY

(75) Inventor: James Erhardt, Bedford, NH (US)

(73) Assignee: Watts Regulator Company, North Andover, MA (US)

(*) Notice: Subject to any disclaimer, the term of this patent is extended or adjusted under 35 U.S.C. 154(b) by 459 days.

(21) Appl. No.: 12/693,592

(22) Filed: Jan. 26, 2010

(65) Prior Publication Data

US 2010/0193043 A1     Aug. 5, 2010

Related U.S. Application Data

(60) Provisional application No. 61/147,405, filed on Jan. 26, 2009.

(51) Int. Cl.
  *F16K 11/10*     (2006.01)
(52) U.S. Cl. .................. 137/625.47; 137/887; 237/66
(58) Field of Classification Search ............ 137/625.47, 137/887; 237/66, 69
  See application file for complete search history.

(56) References Cited

U.S. PATENT DOCUMENTS

| | | | | |
|---|---|---|---|---|
| 2,698,731 A * | 1/1955 | Koehler et al. | ............... | 251/172 |
| 3,089,513 A * | 5/1963 | Kirk, Jr. | ................... | 137/505.34 |
| 3,477,469 A * | 11/1969 | Paley | ............................ | 137/883 |
| 4,291,768 A * | 9/1981 | Diehl | ............................ | 166/378 |
| 4,479,459 A * | 10/1984 | Piper | ............................ | 122/379 |
| 4,681,133 A * | 7/1987 | Weston | .................... | 137/315.18 |
| 5,944,055 A * | 8/1999 | Dicky | ...................... | 137/625.47 |
| 6,176,466 B1 * | 1/2001 | Lam et al. | ...................... | 251/1.3 |
| 6,935,361 B2 * | 8/2005 | Rocheleau | .................... | 137/340 |
| 7,019,541 B2 * | 3/2006 | Kittrell | .......................... | 324/696 |
| 7,191,789 B2 * | 3/2007 | Corbett, Jr. | ................ | 137/15.01 |
| 7,255,131 B2 * | 8/2007 | Paper et al. | ............. | 137/625.47 |
| 7,681,596 B2 * | 3/2010 | Reck | ............................ | 137/883 |

* cited by examiner

*Primary Examiner* — John Fox
(74) *Attorney, Agent, or Firm* — Edwards Wildman Palmer LLP; David J. Silvia; George N. Chaclas

(57) ABSTRACT

A valve assembly including a body having a first end, a second end, a passageway extending between the first and the second ends, and four ports defined by the body and connected to the passageway. The assembly also has a first valve member received in the passageway at an intersection of the passageway and the first port, the valve member including a tee shaped passage such that in a first position the valve member opens the passageway and the first port, in a second position closes the passageway and connects the first end to the first port, in a third position closes the passageway and connects the first port to the second end, and in a fourth position opens the passageway and closes the first port. The assembly also includes a second valve member for opening and closing the third port.

13 Claims, 10 Drawing Sheets

VALVE ASSEMBLY

CROSS-REFERENCE TO RELATED APPLICATION

This application claims priority to U.S. Provisional Patent Application No. 61/147,405, filed Jan. 26, 2009, which is incorporated herein by reference.

TECHNICAL FIELD OF THE DISCLOSURE

The present disclosure relates to a valve assembly that can be used, for example, as part of a hydronic heating and cooling system.

BACKGROUND OF THE DISCLOSURE

Residential hydronic heating systems often include water expansion tanks since thermal expansion of heated water may occur wherever water is heated in a closed system (e.g., when boiler water is isolated from the public water supply by a one-way valve, such as a feed water pressure reducing valve, backflow preventer, check valve, etc.). Water expansion tanks are designed to absorb the increased volume of water caused by thermal expansion and maintain a balanced pressure throughout the hot water heating system. The expansion tanks prevent system damage and unnecessary relief valve discharge caused by excessive pressure from thermal expansion.

Water expansion tanks, as well as other components of residential hydronic heating systems such as pressure reducing valves, require periodic maintenance. Accordingly, water expansion tanks are often separated from the system by an isolating ball valve so that the expansion tank can be isolated from the heating system for maintenance and repair, as well as a purge ball valve so that the expansion tank can be drained of water during the maintenance and repair.

What is still desired is a new and improved valve assembly that can be used, for example, to connect an expansion tank to a residential hydronic heating system.

SUMMARY OF THE DISCLOSURE

Exemplary embodiments of the present disclosure provide a new and improved valve assembly that includes a first valve member for isolating an expansion tank of a residential hydronic heating system and a second valve member for allowing the expansion tank to be drained.

According to one aspect of the disclosure, the valve assembly includes a body having a first open end, a second open end, a passageway extending between the first and the second open ends, and four ports defined by the body and connected to the passageway. The first valve member is received in the passageway at an intersection of the passageway and the first port, and includes a tee shaped passage such that, in a first position the valve member opens the passageway and the first port, in a second position the valve member closes the passageway and connects the first open end to the first port, in a third position the valve member closes the passageway and connects the first port to the second open end, and, in a fourth position the valve member opens the passageway and closes the first port. The second valve member is for opening and closing the third port.

Among other advantages, the valve assembly provided by the present disclosure can be used, for example, to connect an expansion tank to a residential hydronic heating system and also connect a pressure reducing valve to the heating system. The new and improved valve assembly allows easy testing, maintenance, and replacement of the expansion tank and the pressure reducing valve.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout, and wherein.

DETAILED DESCRIPTION OF AN EXEMPLARY EMBODIMENT

Figure 7A:
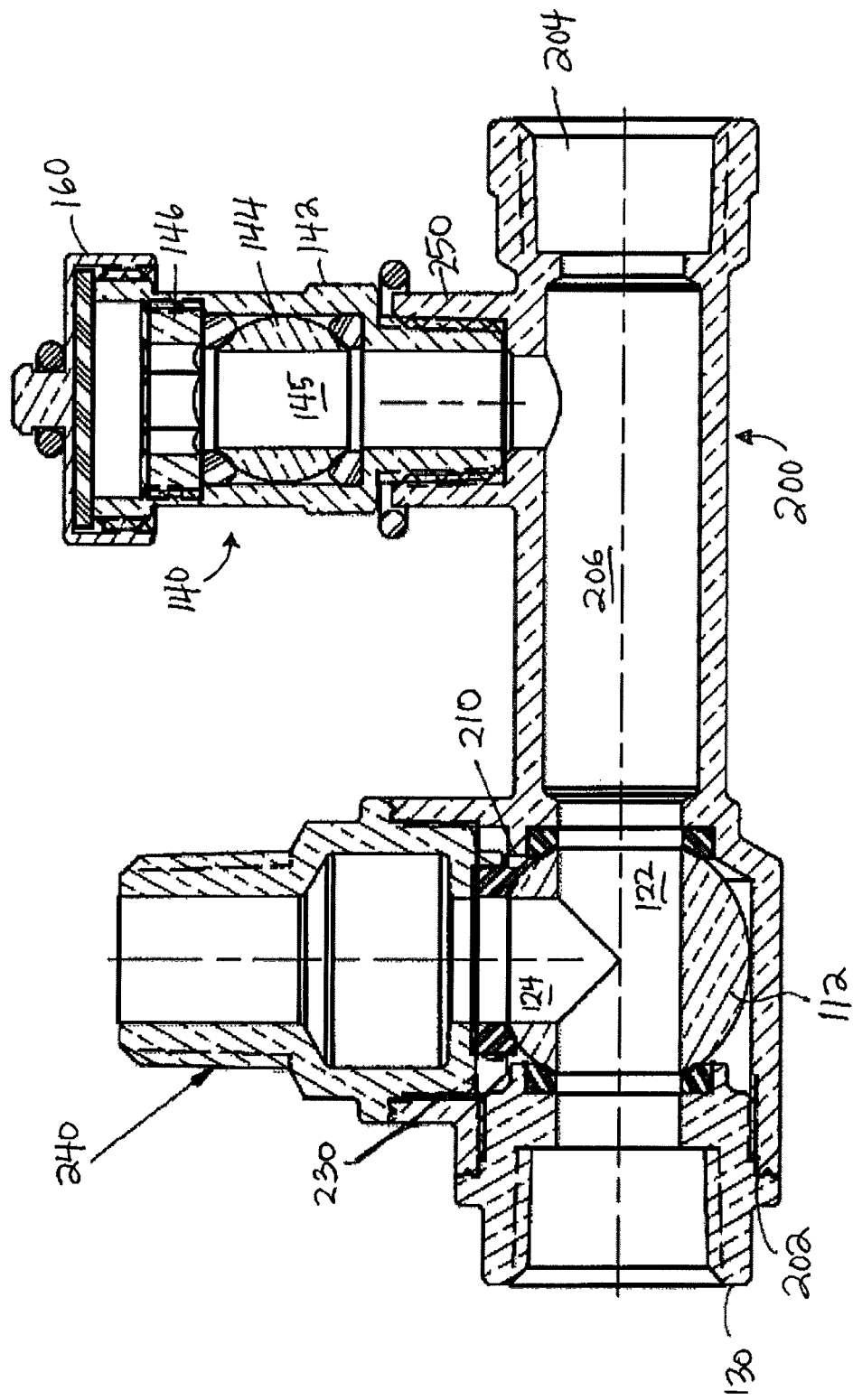
FIG. 7a is a sectional view of the valve assembly of FIG. 1 taken along line 7-7 of FIG. 6, wherein a first valve member is shown in a first position.
Figure 7C:
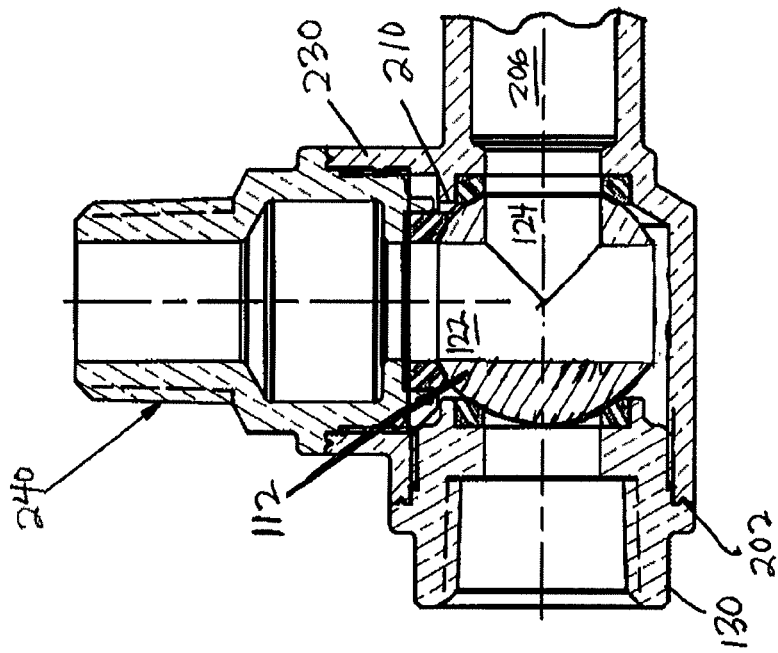
FIG. 7c is a sectional view of a portion of the valve assembly of FIG. 1 taken along line 7-7 of FIG. 6, wherein the first valve member is shown in a third position.
Figure 7B:
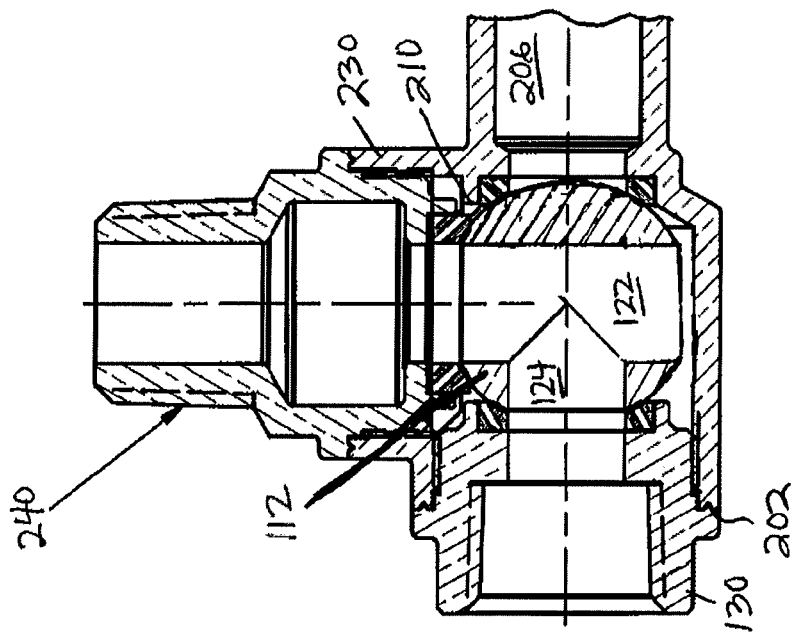
FIG. 7b is a sectional view of a portion of the valve assembly of FIG. 1 taken along line 7-7 of FIG. 6, wherein the first valve member is shown in a second position.
Figure 7D:
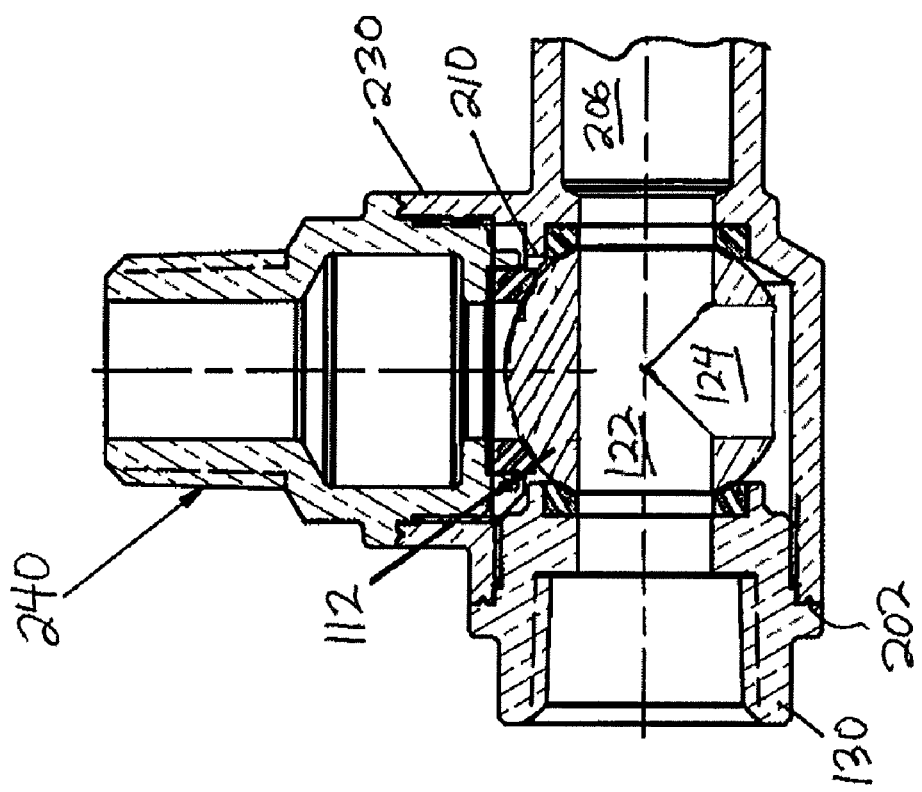
FIG. 7d is a sectional view of a portion of the valve assembly of FIG. 1 taken along line 7-7 of FIG. 6, wherein the first valve member is shown in a fourth position.
Figure 8:
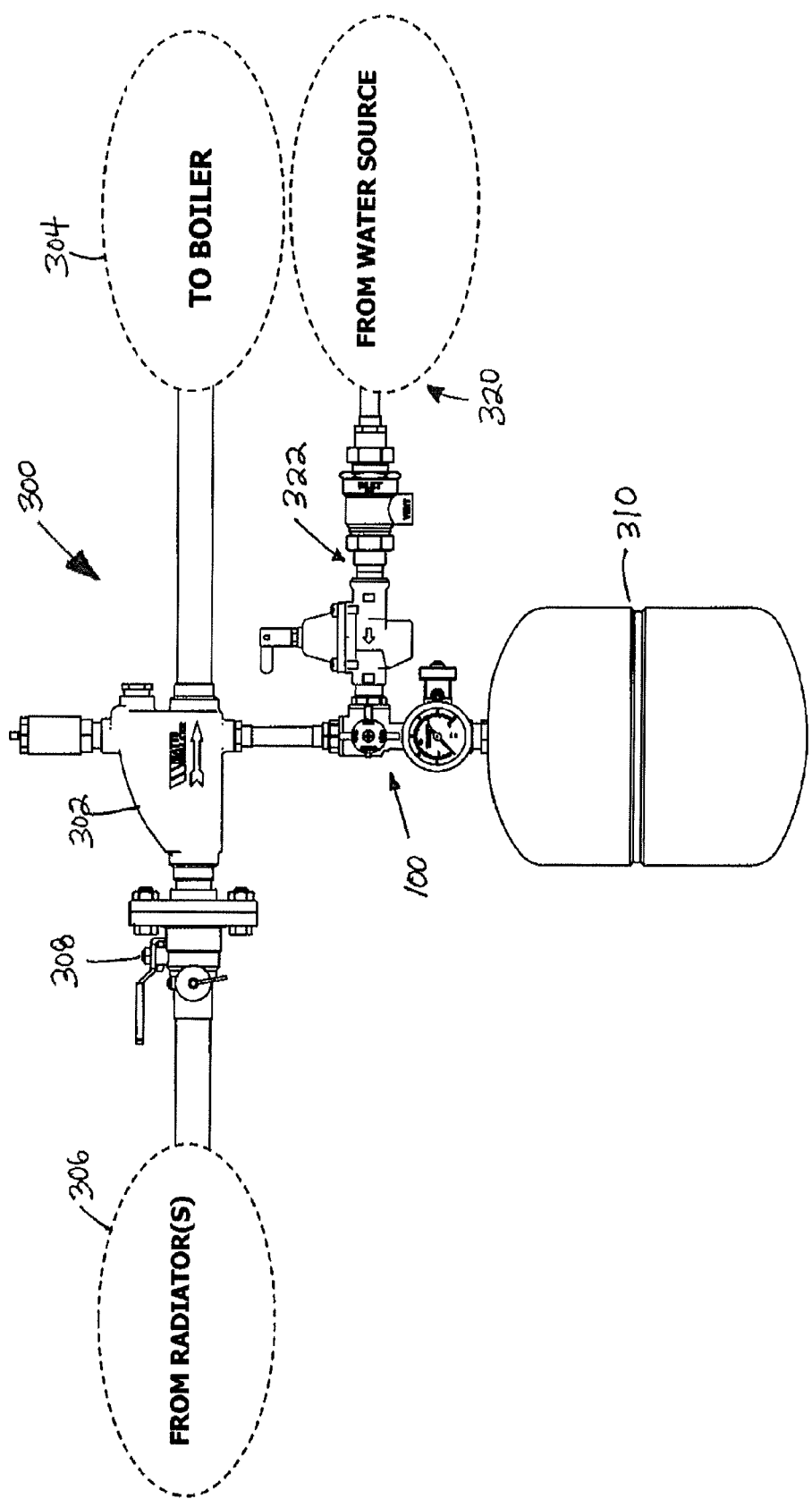
FIG. 8 is a front elevation view of the valve assembly of FIG. 1, wherein the valve assembly is shown connecting a water supply line and an expansion tank to a residential hydronic heating system.

Referring now to the detailed drawings, FIGS. 1-7 show an exemplary embodiment of a combination ball valve assembly 100 constructed in accordance with the present disclosure that can be used, for example, to connect an expansion tank 310 and a water supply line 320 to a residential hydronic heating system 300, an example of which is shown in FIG. 8.

The new and improved combination ball valve assembly 100 includes a first ball valve 110 for isolating the expansion tank 310 and the water supply line 320 from the heating systems 300, and a second ball valve 140 for allowing the expansion tank 310 and the heating system 300 to be drained. A body 200 of the assembly 100 has a first open end 202, a second open end 204, a passageway 206 extending between the first and the second open ends 202, 204, and four ports 210, 212, 214, 216 defined by the body 200 and connected to the passageway 206. The first ball valve 110 controls flow through the passageway 206 and the first port 210, while the second ball valve 140 controls flow through the third port 214.

The first ball valve 110 includes a rotatable ball member 112 received in the passageway 206 of the body 200 at an intersection of the passageway 206 and the first and the second ports 210, 212. The first ball valve 110 also includes a stem 114 connected to the ball member 112 and extending out of the second port 212 of the body 200, and a handle 116 secured to a distal end of the stem 114 with a screw 117. In the exemplary embodiment shown, a socket 220 extends from the second port 212 and a spring 118 is positioned between the socket 220 and the handle 116 and biases the handle away from the body 200. The socket 220 includes a key 222 that mates with a wall 120 of the handle 116, such that the handle can only be turned when the handle 116 is depressed towards the socket 220 against the force of the spring 118 to avoid the key 222.

The ball member 112 includes a first bore 122 that extends through the ball member 112 and a second bore 124 that extends into the ball member and connects to the first bore 122 at an angle of 90°, such that the first and second bores form a tee shaped passage. In a first position of the ball member 112, which is shown in FIG. 7a, the first and the second bores 146, 148 open the passageway 206 and the first port 210. In a second position, that is shown in FIG. 7b, the valve member 112 closes the passageway 206 and connects the first open end 202 to the first port 210, and, in a third position, that is shown in FIG. 7c, the valve member 112 closes the passageway 206 and connects the first port 210 to the second open end 204. In a fourth position, that is shown in FIG. 7d, the valve member 112 opens the passageway 206 and closes the first port 210.

According to one exemplary embodiment of use, illustrated in FIG. 8, the first port 210 acts as an inlet and is connected to the water supply line 320, while the first open end 202 acts as an outlet and is connected to an air separator 302 of the heating system 300, and the second open end 204 is connected to the expansion tank 310. During normal operation, the ball member 112 is placed in the first position, shown in FIG. 7a. However, during replacement or maintenance of the expansion tank 310, the handle 116 and the ball member 112 are turned 90° counterclockwise (with reference to FIG. 4) so that the ball member 112 is placed in the second position, shown in FIG. 7b, and the expansion tank 310 is isolated from the heating system 300. Once the expansion tank 310 is isolated from the heating system 300, the second ball valve 140 can be opened to drain the expansion tank 310 and the tank can be tested or replaced. An example of an expansion tank is a Series ET expansion tank sold by the assignee of the present application, Watts Regulator Company (www.watts.com).

As shown in FIG. 8, the heating system 300 includes a boiler 304 and radiators 306 separated by the air separator 302 and a shut-off/purge valve 308. If any of the components need to be replaced or maintained, the handle 116 and the ball member 112 are turned 90° clockwise (with reference to FIG. 4) so that the ball member 112 is placed in the third position, shown in FIG. 7c, and the heating system 300 is isolated from the water supply 320 and the expansion tank 310. An example of an air separator is an AS-B air separator sold by Watts Regulator Company (www.watts.com).

In the exemplary embodiment shown in FIG. 8, the water supply line 320 includes a fill valve and backflow preventer assembly 322. An example of a fill valve and backflow preventer assembly is a B911S assembly sold by Watts Regulator Company (www.watts.com). With the ball member 112 in the third position, shown in FIG. 7c, the fill valve 322 can be adjusted using a pressure gauge 150 fitted in a socket 260 of the fourth port 216, as shown best in FIG. 5. A suitable water pressure gage is a Series 276H300 gage sold by Watts Regulator Company (www.watts.com).

During replacement of the assembly 322, the handle 116 and the ball member 112 are turned 180° in either direction (with reference to FIG. 4) so that the ball member 112 is placed in the fourth position, shown in FIG. 7d, and the assembly 322 is isolated from the heating system 300. In addition, the heating system 300 and the expansion tank 310 can be drained through the second ball valve 140 when the ball member 112 is placed in the fourth position.

In the exemplary embodiment shown, the first open end 202 of the body 200 is threaded and an annular end cap 130 is threaded into the first open end 202. As shown in FIG. 7a, the end cap 130 includes an internal thread, which is used to connect the assembly 100 to a pipe of the heating system 300. The second open end 204 of the body 200 is threaded for connection to the expansion tank 310. A socket 230 extends from the first port 210 and is threaded and an adaptor 240 is threaded into the socket. The adaptor 240 includes external threads for connection to the fill valve and backflow preventer assembly 322.

Figure 1:
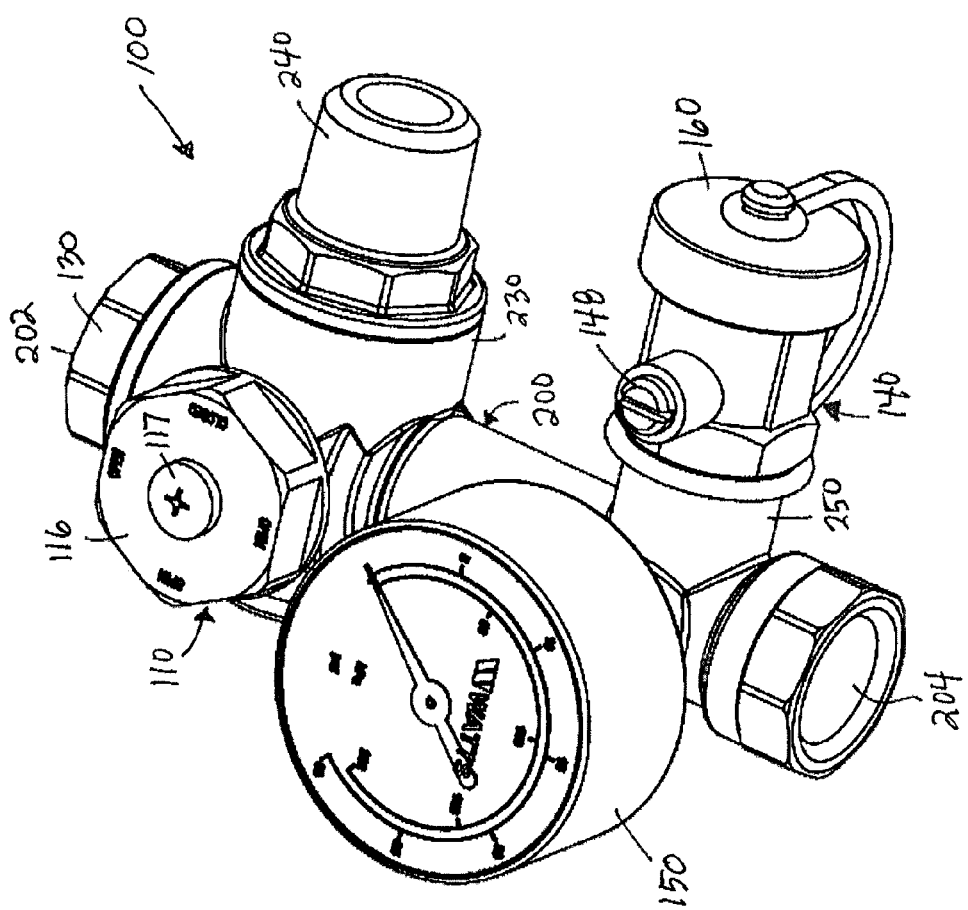
FIG. 1 is a perspective view of an exemplary embodiment of a combination ball valve assembly constructed in accordance with the present disclosure.
Figure 2:
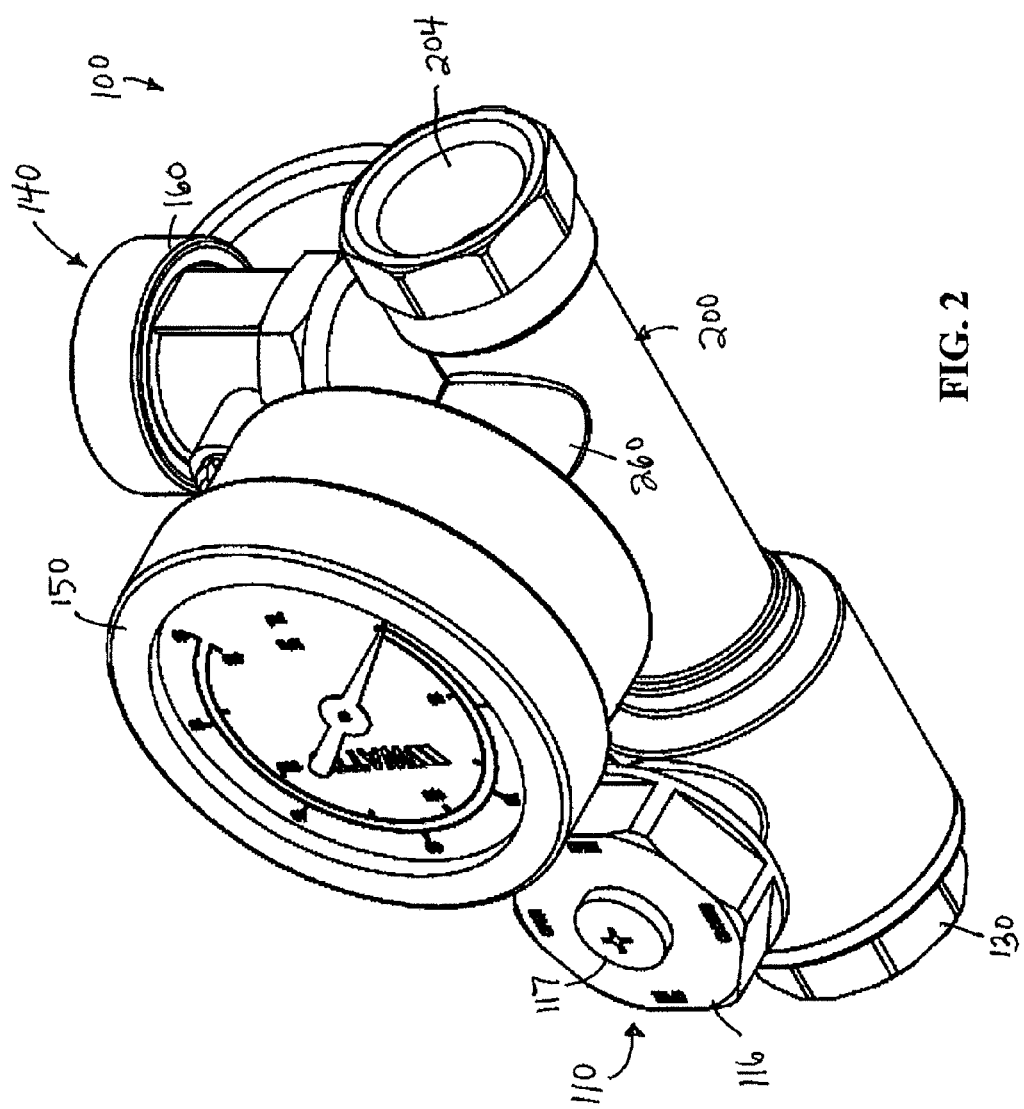
FIG. 2 is another perspective view of the valve assembly of FIG. 1.
Figure 3:
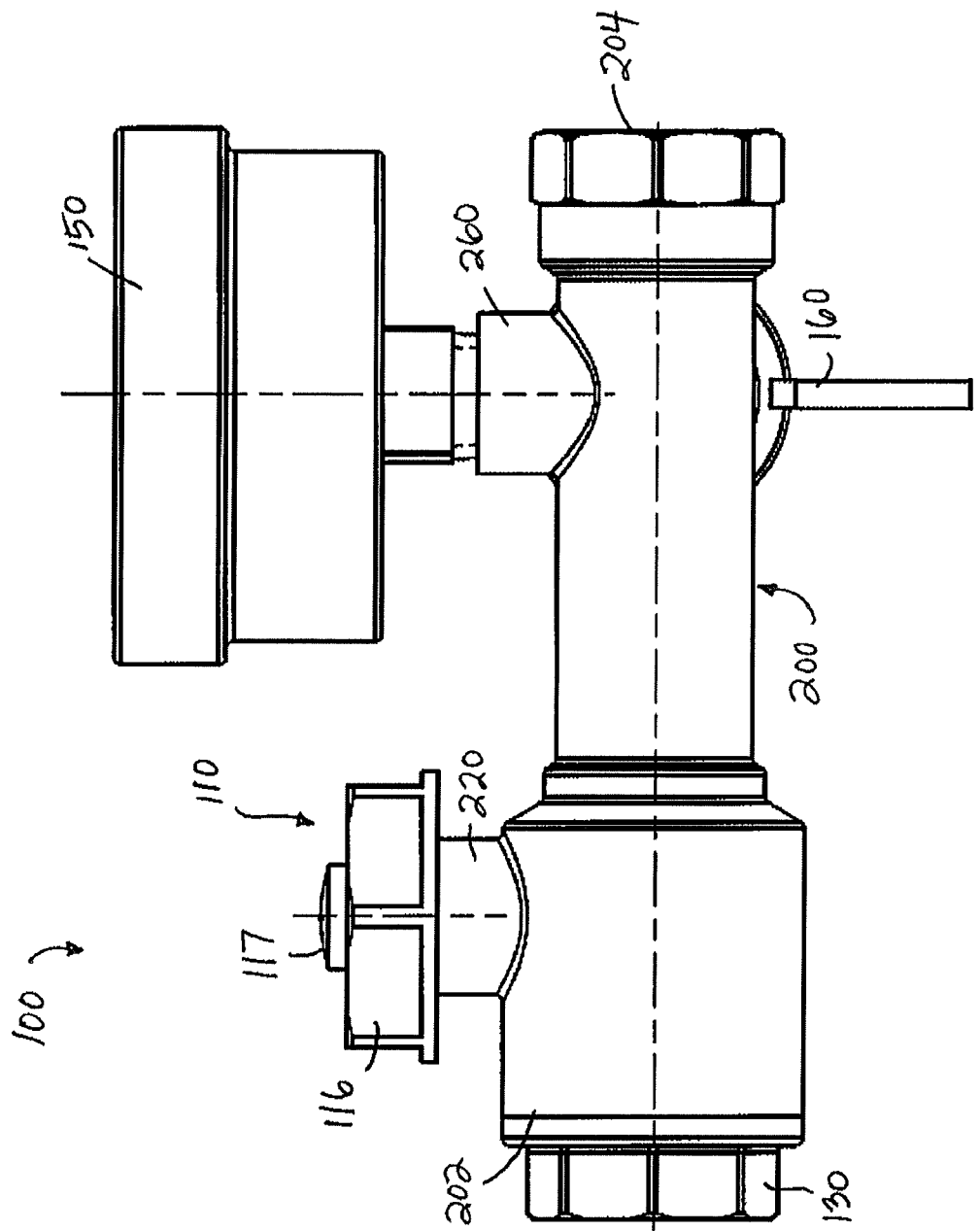
FIG. 3 is a side elevation view of the valve assembly of FIG. 1.
Figure 4:
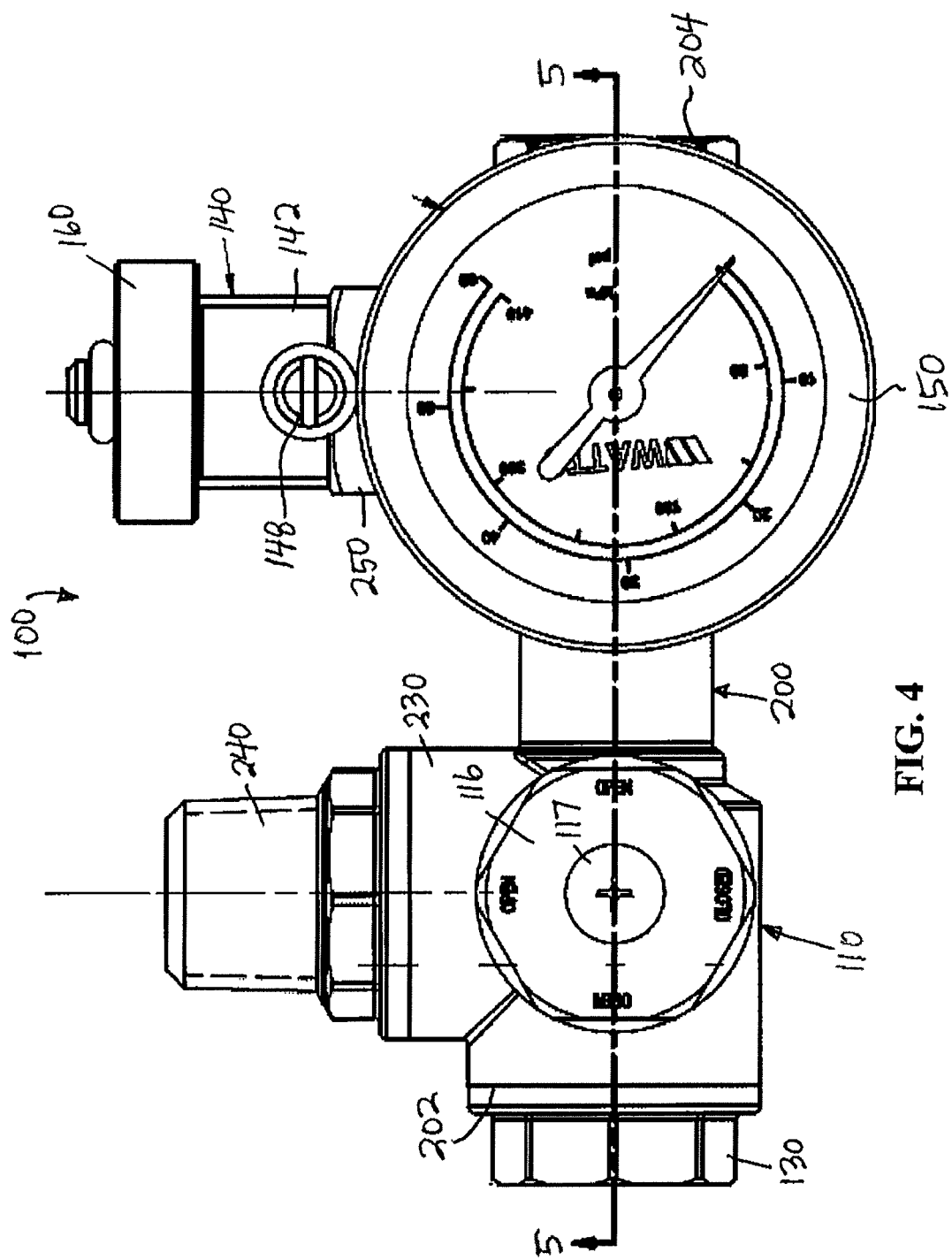
FIG. 4 is a top plan view of the valve assembly of FIG. 1
Figure 5:
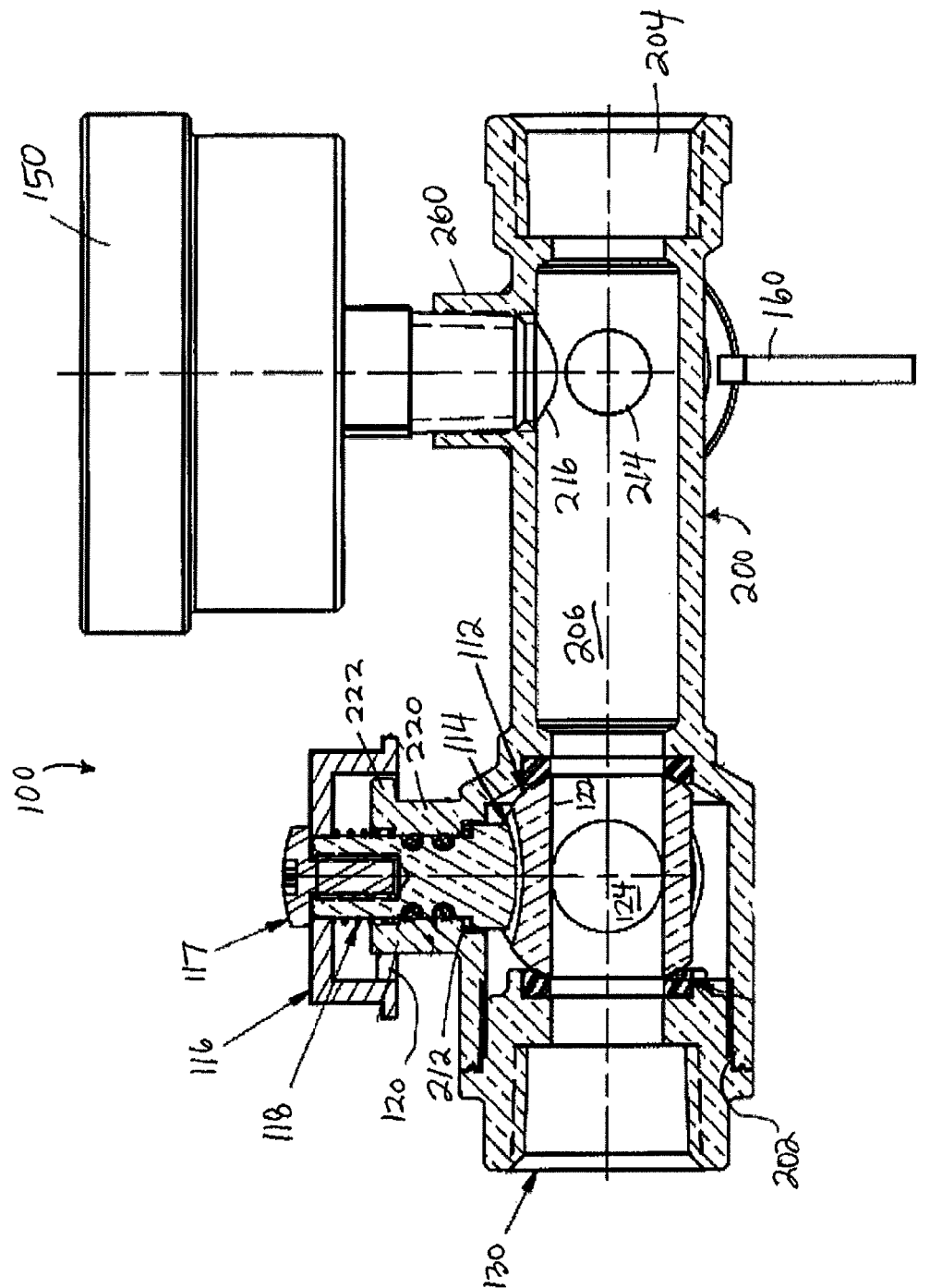
FIG. 5 is a sectional view of the valve assembly of FIG. 1 taken along line 5-5 of FIG. 4.
Figure 6:
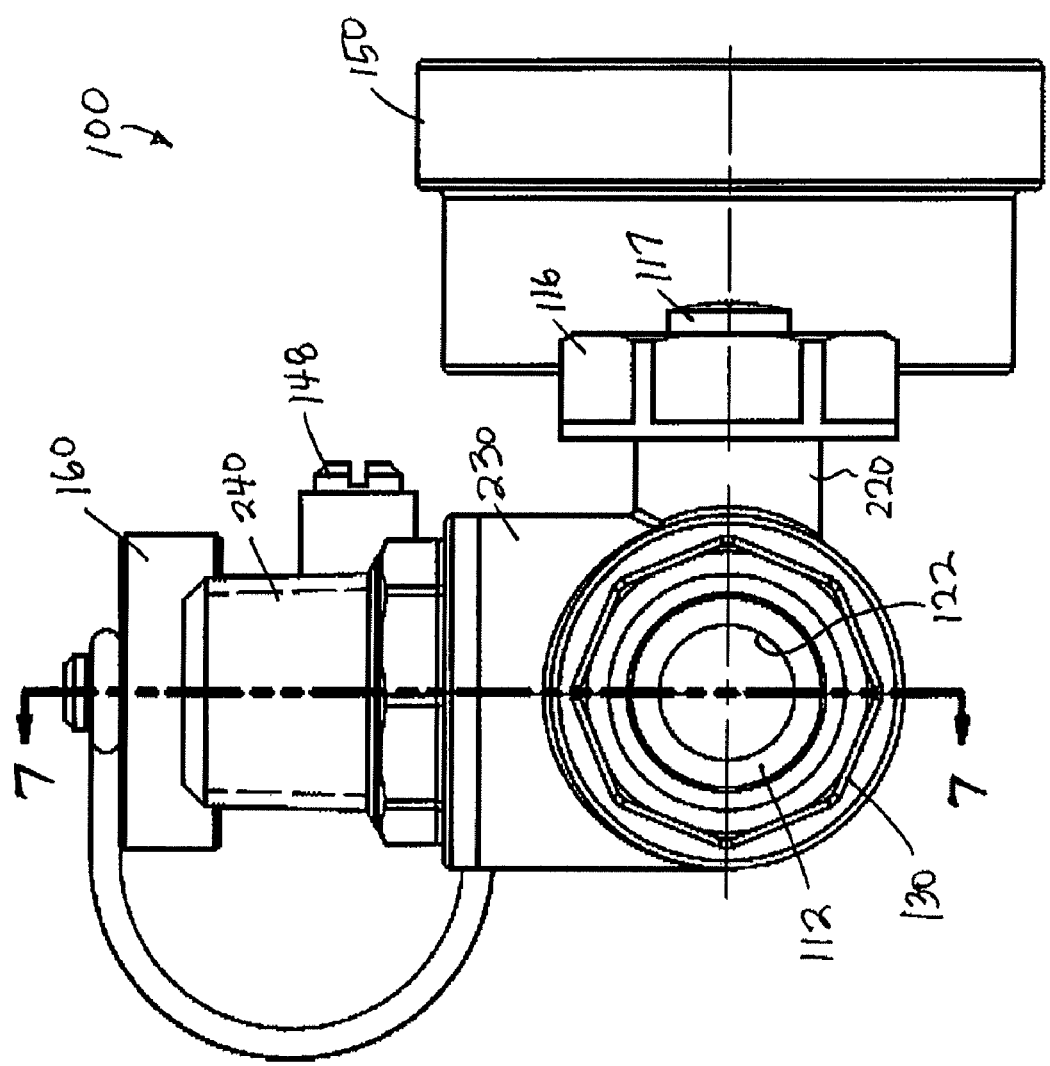
FIG. 6 is an end elevation view of the valve assembly of FIG. 1.

Still referring to FIG. 7a, a socket 250 extends from the third port 214 and is threaded and a tubular housing 142 of the second ball valve 140 is threaded into the socket 250. A valve member 144 having a single through bore 145 is received in the tubular housing 142 and retained therein with a grate 146. As shown in FIG. 1, a stem 148 connects to the valve member 144 and extends out of the housing 142 and allows a user to open and close the second ball valve 140. A removable cap 160 closes the ball valve 140 when not in use.

Thus, the present disclosure provides a new and improved combination ball valve assembly 100 for use with a residential hydronic heating system. It should be understood, however, that the exemplary embodiments described in this specification have been presented by way of illustration rather than limitation, and various modifications, combinations and substitutions may be effected by those skilled in the art without departure either in spirit or scope from this disclosure in its broader aspects and as defined by the appended claims.

What is claimed is:

1. A valve assembly comprising:
    a body including,
        a first open end,
        a second open end,
        a passageway extending between the first and the second open ends,
        a first port defined by the body and connected to the passageway,
        a second port defined by the body and connected to the passageway adjacent the first port,
        a third port defined by the body and connected to the passageway, and
        a fourth port defined by the body and connected to the passageway;
    a first valve member received in the passageway at an intersection of the passageway and the first port, the valve member including a tee shaped passage such that, in a first position the valve member opens the passageway and the first port, in a second position the valve member closes the passageway d connects the first open end to the first port, in a third position the valve member closes the passageway and connects the first port to the second open end, and in a fourth position the valve member opens the passageway and closes the first port;

a second valve member for opening and closing the third port;

an expansion tank connected to the second open end of the body of the valve;

a fill valve and backflow preventer assembly connected to the first port of the body of the valve assembly; and an air separator connected to the first open end of the body of the valve assembly.

2. A valve assembly according to claim 1, further comprising a pressure gage secured in the fourth port.

3. A valve assembly according to claim 1, further comprising an annular end cap received in the first end of the body, securing the first valve member in the body.

4. A valve assembly according to claim 1, further comprising a valve stem connected to the first valve member and extending through the second port to a distal end, and a handle connected to the distal end of the valve stem.

5. A valve assembly according to claim 1, wherein the body is of unitary construction.

6. A valve assembly according to claim 1, wherein the second valve member is received in housing secured in a socket formed around the third port.

7. A valve assembly comprising:
a unitary body having a first open end, a second open end, a passageway extending between the first and the second open ends, a first port defined by the body and connected to the passageway, a second port defined by the body and connected to the passageway adjacent the first port, a third port defined by the body and connected to the passageway, and a fourth port defined by the body and connected to the passageway;

a first valve member received in the passageway at an intersection of the passageway and the first and the second ports, the valve member including a tee shaped passage such that, in a first position the valve member opens the passageway and the first port, in a second position the valve member closes the passageway and connects the first open end to the first port, in a third position the valve member closes the passageway and connects the first port to the second open end, and in a fourth position the valve member opens the passageway and closes the first port;

an annular end cap received in the first end of the body, securing the first valve member in the body;

a valve stem connected to the first valve member and extending through the second port to a distal end;

a second valve member for opening and closing the third port;

a pressure gage secured in the fourth port;

an expansion tank connected to the second open end of the body of the valve;

a fill valve and backflow preventer assembly connected to the first port of the body of the valve assembly; and an air separator connected to the first open end of the body the valve assembly.

8. A valve assembly according to claim 7, wherein the second valve member is received in housing secured in a socket formed around the third port.

9. A valve assembly comprising:
a body having a first open end, a second open end, a passageway extending between the first and the second open ends, a first port defined by the body and connected to the passageway, a second port defined by the body and connected to the passageway adjacent the first port, a third port defined by the body and connected to the passageway, and a fourth port defined by the body and connected to the passageway;

a first valve member received in the passageway at an intersection of the passageway and the first and the second ports, the valve member including a passage such that, in a first position the valve member opens the passageway and the first port, in a second position the valve member closes the passageway and connects the first open end to the first port, in a third position the valve member closes the passageway and connects the first port to the second open end, and in a fourth position the valve member opens the passageway and closes the first port;

a valve stem connected to the first valve member and extending through the second port to a distal end;

a second valve member for opening and closing the third port;

an expansion tank connected to the second open end of the body of the valve;

a fill valve and backflow preventer assembly connected to the first port of the body of the valve assembly; and an air separator connected to the first open end of the body of the valve assembly.

10. A valve assembly according to claim 9, further comprising a pressure gage secured in the fourth port.

11. A valve assembly according to claim 9, further comprising an end cap received in the first end of the body, securing the first valve member in the body.

12. A valve assembly according to claim 9, wherein the second valve member is received in housing secured in a socket formed around the third port.

13. A valve assembly according to claim 9, wherein the body is of unitary construction.

* * * * *